March 10, 1964  H. J. BUTLER  3,124,217
SPOT TYPE DISC BRAKES FOR VEHICLES
Filed March 2, 1961  3 Sheets-Sheet 1
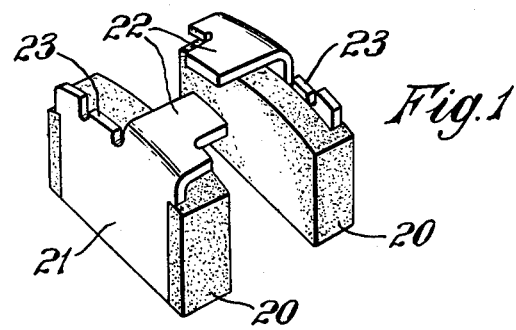
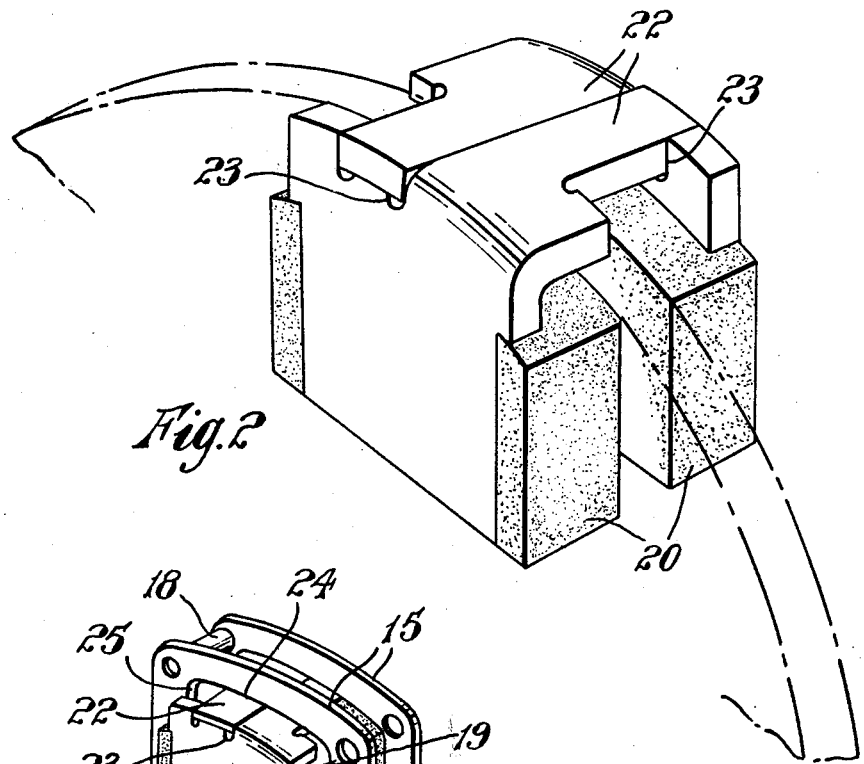
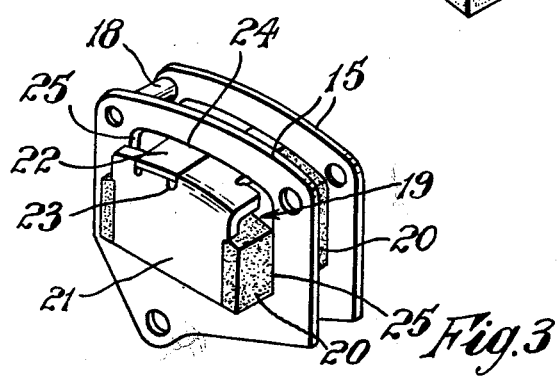
Inventor
Henry James Butler
by Benj. T. Rauber
his attorney March 10, 1964     H. J. BUTLER     3,124,217
SPOT TYPE DISC BRAKES FOR VEHICLES Filed March 2, 1961     3 Sheets-Sheet 2

Inventor:
Henry James Butler
by Benj. T. Rauber
his attorney

March 10, 1964 H. J. BUTLER 3,124,217
SPOT TYPE DISC BRAKES FOR VEHICLES
Filed March 2, 1961 3 Sheets-Sheet 3

3,124,217
SPOT TYPE DISC BRAKES FOR VEHICLES
Henry James Butler, Sutton Coldfield, England, assignor to Dunlop Rubber Company Limited, London County, England, a British company
Filed Mar. 2, 1961, Ser. No. 92,921
Claims priority, application Great Britain Mar. 5, 1960
5 Claims. (Cl. 188—73)

The friction pads of disc brakes tend to wear unevenly and, as the result, the pistons utilized to apply them are liable after a time to jam in their cylinders. The present invention provides for guiding of the friction pads in such a way as to obviate this difficulty.

The invention provides a disc brake including a braking disc, friction pads movable into engagement with opposite sides of the disc in apertures in fixed guide plates located on opposite sides of the disc and backing plates for the friction pads, the backing plates having interengaging formations which maintain the braking surfaces of the friction pads in parallel relationship and the guide plates coacting with the friction pads and backing plates to prevent rotation of the friction pads about axes normal to the plane of the disc. Preferably each of the backing plates has at one end an out-turned ear which extends beyond the periphery of the disc into abutment with the other backing plate and also with a corresponding ear on the other end of the other backing plate, the ears contacting the outer edges of the apertures in the guide plates and the friction pads contacting the side edges of the apertures in the guide plates.

The friction pads, which are guided at the sides by the side edges of the apertures in the fixed plates, are preferably fixed to the backing plates. In this case they may terminate short of the ears on the backing plates. However, the friction pads may be unattached to the backing plates but in this case they abut at their outer ends against the ears and at their inner ends against the inner edges of the apertures. In either case, the friction pads are restrained from movement, when they are applied to the disc, which could cause uneven wear and tapering of the friction surfaces at top or bottom or at either side of the friction pads.

Figure 4:
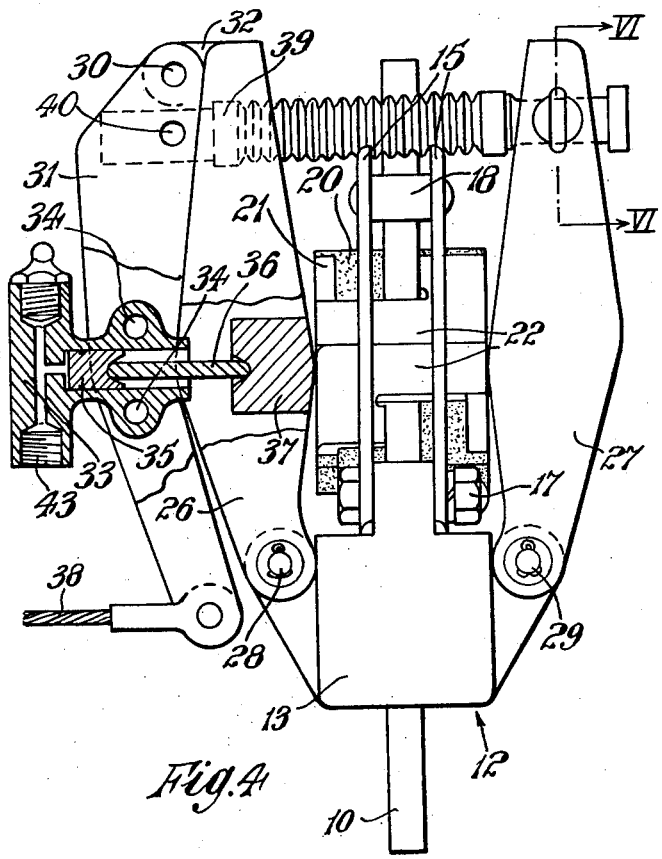
Figure 6:
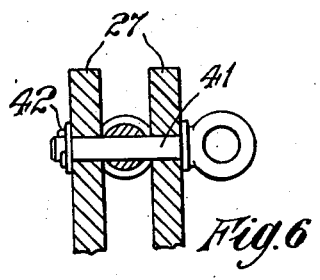
Figure 5:
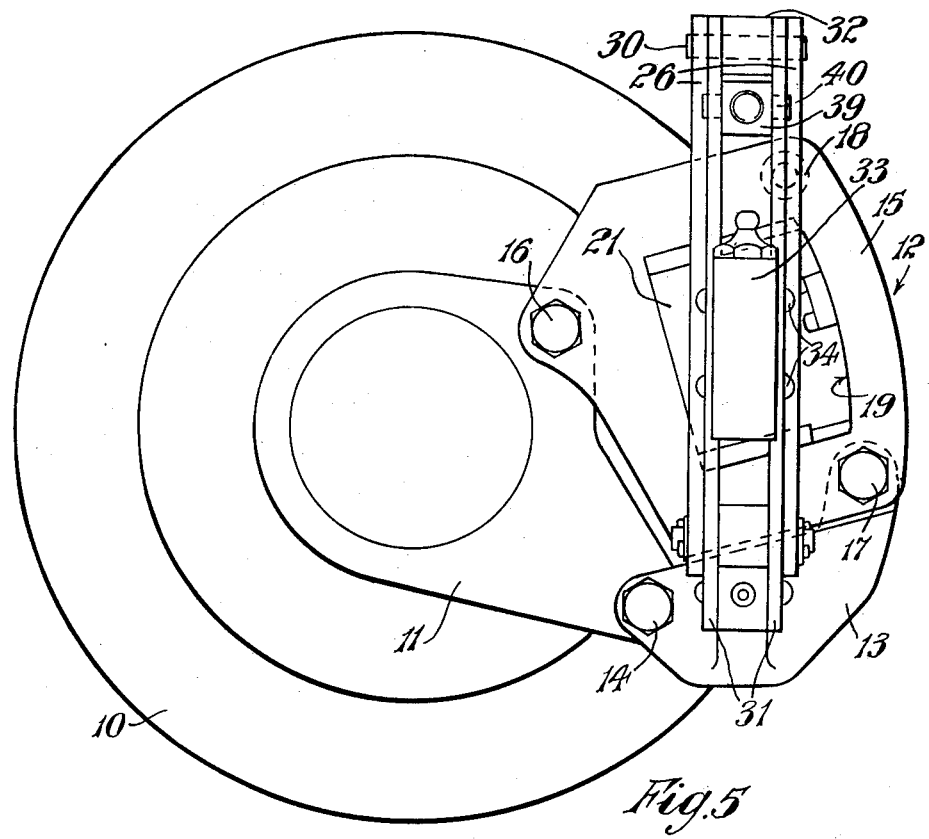

The invention will now be described in more detail with reference to the accompanying drawings, in which
FIGS. 1–3 are perspective views showing the friction pads, backing plates and guide plates,
FIG. 4 is an end elevation, partly in section, of a disc brake,
FIG. 5 is a corresponding side elevation, and
FIG. 6 is a section on the line VI—VI in FIG. 4.

The disc brake shown in the drawings includes a braking disc 10 attached to a wheel (not shown) of a vehicle to be braked. Attached to a fixed part 11 of the vehicle is a caliper 12, which includes an end member 13 fixed by a bolt 14 to the part 11, and a pair of guide plates 15, one on each side of the disc 10, fixed to the part 11 and the end member 13 by bolts 16, 17 respectively. The guide plates 15 are joined by a spacer 18. Each of the guide plates is provided with an aperture 19 in which is slidably mounted a friction pad assembly, constituted by a friction pad 20 and an associated backing plate 21 to which the friction pad is fixed. As shown most clearly in FIGS. 1–3 the backing plates 21 have out-turned ears 22, each of which is accommodated in a groove 23 in the other backing plate and abuts against the companion ear 22 on the other backing plate. The ears 22 contact the outer edges 24 of the apertures 19 in the guide plates while the friction pads 20 contact the side edges 25 of these apertures. Consequently, when the friction pad assemblies are moved towards and away from the disc 10 by the mechanism shortly to be described they are prevented from tilting. They are accordingly presented square to the disc 10 and do not wear unevenly.

The friction pad assemblies are controlled by bifurcated actuating levers 26, 27 which are pivoted to the caliper at 28, 29 respectively. Pivoted by a pin 30 to an extension 32 of the lever 26 is a bifurcated operating lever 31. A cylinder 33 is fixed by studs 34 to the lever 31. In the cylinder 33 is a piston 35, and a thrust rod 36 is positioned between the piston and a block 37 fixed to the lever 26. A cable 38 connects the hand brake (not shown) to the lever 31, which is connected to the lever 27 by a link 39, pivoted by a pin 40 to the lever 31 and by a removable pin 41 to the lever 27. The pin 41 is held in place by a cotter 42. Upon removal of the cotter pin 42, the pin 41 may be removed, thereby freeing the link 39 from the lever 27 whereupon the links 26 and 27 may be swung on their respective pivot pins 28 and 29 away from the friction pads sufficiently to permit these pads to be withdrawn from the apertures in the caliper as described in my co-pending application Serial No. 92,864, filed March 2, 1961. Or, as described in said application, the bolt 16 may be removed and the caliper swung on the bolt 14 clear of the levers and the friction pads withdrawn. Upon removing both bolts 14 and 16, the caliper may be withdrawn with the friction pads.

When fluid under pressure is admitted through an inlet 43 to the cylinder 33, the cylinder 33 and the piston 35 are moved apart, so causing the levers 26, 27 to move inwards to engage the friction pads 20 with the disc 10. Similarly, on operation of the hand brake, the resulting tension on the rod 38 will cause inward movement of the levers 26, 27 to apply the brake.

The guiding system according to the invention is thus extremely simple. All that is required is a fixed guide plate 15 at each side of the disc formed with a guiding aperture 19 of appropriate shape and the provision of backing plates 21, each of which has an ear 22 projecting at right angles from its outer edge at one side thereof and a groove 23 into which fits the ear of the opposite backing plate. When the backing plates are assembled within the guide plates at opposite sides of the disc, the ears 22 on the two backing plates abut together side by side as shown most clearly in FIG. 2 and are received in the groove 23 of the other backing plate, thus maintaining the braking surfaces of the friction pads parallel to one another. They fit closely against the outer edges of the apertures 19 in the guide plates and as these apertures guide the friction pads 20 at the sides and at their inner edges the friction pads cannot tilt about axes normal to the plane of the disc. Uneven wear of the friction pads is therefore effectively prevented.

Having now described my invention, what I claim is:
1. A disc brake comprising a braking disc, fixed guide plates located on opposite sides of said disc and having apertures adjacent to said disc, friction pads in said apertures and movable therein into engagement with the opposed sides of said disc, and backing plates for the said friction pads, each said backing plate having at one end an out-turned ear which extends beyond the periphery of said disc into abutment with the other backing plate and and also with a corresponding ear on the end of the other backing plate, the ears contacting the outer edges of the apertures in the guide plates and the friction pads contacting the side edges of the apertures in the guide plates.

2. A disc brake according to claim 1, in which the friction pads also contact the inner edges of the apertures in the guide plates.

3. A disc brake according to claim 1, in which the friction pads are fixed to the backing plates.

4. A disc brake according to claim 2, in which the friction pads are unattached to the backing plates and abut at their outer ends against the ears.

5. The disc brake of claim 1 in which each backing plate has a transverse groove adjoining the ear into which fits the ear of the other backing plate.

References Cited in the file of this patent
UNITED STATES PATENTS

| | | |
|---|---|---|
| 2,527,072 | Pogue | Oct. 24, 1950 |
| 2,830,679 | Butler | Apr. 15, 1958 |
| 2,959,253 | Goode | Nov. 8, 1960 |
| 3,051,272 | Burnett | Aug. 28, 1962 |

FOREIGN PATENTS

| | | |
|---|---|---|
| 761,479 | Great Britain | Nov. 14, 1956 |